United States Patent [19]

Spangler

[11] Patent Number: 5,478,370
[45] Date of Patent: Dec. 26, 1995

[54] METHOD FOR PRODUCING SYNTHESIS GAS

[75] Inventor: Michael J. Spangler, Sandwich, Ill.

[73] Assignee: Amoco Corporation, Chicago, Ill.

[21] Appl. No.: 269,699

[22] Filed: Jul. 1, 1994

[51] Int. Cl.$^6$ .................... C01B 3/26; C01B 3/38
[52] U.S. Cl. ............... 48/197 R; 48/198.2; 48/198.7; 48/92; 252/373
[58] Field of Search .................. 48/92, 197 R, 48/198.2, 198.3, 198.5, 198.7; 252/373

[56] References Cited

U.S. PATENT DOCUMENTS

| | | | |
|---|---|---|---|
| 1,899,184 | 2/1933 | DeSimo | 48/198.5 |
| 2,481,217 | 9/1949 | Hemminger | 48/198.5 |
| 2,585,737 | 2/1952 | Carpenter | 252/373 |
| 2,607,670 | 8/1952 | Lewis | 48/198.5 |
| 2,612,444 | 5/1953 | Rummel | 75/40 |
| 2,662,004 | 12/1953 | Gaucher | 252/373 |
| 2,662,912 | 12/1953 | Martin | 252/373 |
| 2,671,719 | 3/1954 | Lewis et al. | 48/198.5 |
| 2,678,264 | 5/1954 | Corner | 252/373 |
| 2,709,645 | 5/1955 | Hill et al. | 48/198.5 |
| 2,844,453 | 7/1958 | Kapp et al. | 48/92 |
| 3,170,017 | 2/1965 | Namy | 266/35 |
| 3,650,519 | 3/1972 | Vogt et al. | 266/36 |
| 3,873,073 | 3/1975 | Baum et al. | 266/16 |
| 3,970,474 | 7/1976 | Anbar et al. | 136/86 |
| 4,062,657 | 12/1977 | Knuppel et al. | 48/77 |
| 4,126,668 | 11/1978 | Erickson | 423/657 |
| 4,132,764 | 1/1979 | Cines et al. | 48/197 R |
| 4,205,194 | 5/1980 | Mitchell, III et al. | 585/407 |
| 4,406,666 | 9/1983 | Paschen et al. | 48/92 |
| 4,443,644 | 4/1984 | Jones et al. | 585/500 |
| 4,443,646 | 4/1984 | Jones et al. | 585/500 |
| 4,443,647 | 4/1984 | Jones et al. | 585/500 |
| 4,544,784 | 10/1985 | Sofranko et al. | 585/500 |
| 4,560,821 | 12/1985 | Jones et al. | 585/500 |
| 4,582,630 | 4/1986 | Quang et al. | 252/373 |
| 4,665,260 | 5/1987 | Jones et al. | 585/500 |
| 4,925,456 | 5/1990 | Egglestone | 252/373 |
| 5,011,625 | 4/1991 | Le Blanc | 252/373 |
| 5,112,527 | 5/1992 | Kobylinski | 252/373 |
| 5,130,286 | 7/1992 | Michaels et al. | 502/341 |
| 5,177,304 | 1/1993 | Nagel | 588/201 |
| 5,298,233 | 3/1994 | Nagel | 423/580.1 |

FOREIGN PATENT DOCUMENTS

| | | |
|---|---|---|
| 0399833 | 11/1990 | European Pat. Off. . |
| 8607351 | 12/1986 | WIPO . |

OTHER PUBLICATIONS

Excerpt from the Res. Discl., 291, 556 and an English Language Abstract, 1988.
An article entitled, "Lead Molten–bed reactors" by L. Meszaros and G. Schobel, appeared in British Chemical Engineering, Jan. 1971, vol. 16, No. 1.
An article entitled, "The rate controlling step for oxidation of liquid lead by argon–oxygen bubbles" by Hem Shanker Ray and Rajendra Kumar Verma, appeared in Transactions of The Indian Institute of Metals, vol. 29, No. 1, Feb. 1976.
An article entitled, "Recovery of Hydrogen from Hydrogen Sulfide" by H. Kiuchi and T. Tanaka, appeared in Society of Mining Engineers, AIME, vol. 262, pp. 248–254.
An article entitled, "Zur Technologie und Anlagentechnik von Bleibad–warmeubertragungs–Systemen" by H. Coenen & E. Klapp, appeared in Verfahrenstechnik 10, (1976) Nr. 6, pp. 434–440.
Japanese Language Patent Document JP 56167789 A2 and English Language Abstract, 1981.

Primary Examiner—Peter Kratz
Attorney, Agent, or Firm—Robert A. Yesukevich; Richard A. Kretchmer

[57] ABSTRACT

The invention provides an improved method for producing synthesis gas from lower alkanes which utilizes molten baths as reactors. A molten metal oxide bath delivers oxygen to a feed stream containing lower alkanes and enhances oxidation of the lower alkanes to produce carbon dioxide and a molten elemental metal. In a molten metal bath, the metal is regenerated to metal oxide by contact with a regenerant such as air. Heat evolved in the molten baths is transferred to an endothermic reactor where a portion of the carbon dioxide is converted to a mixture of carbon oxides and hydrogen.

20 Claims, 1 Drawing Sheet

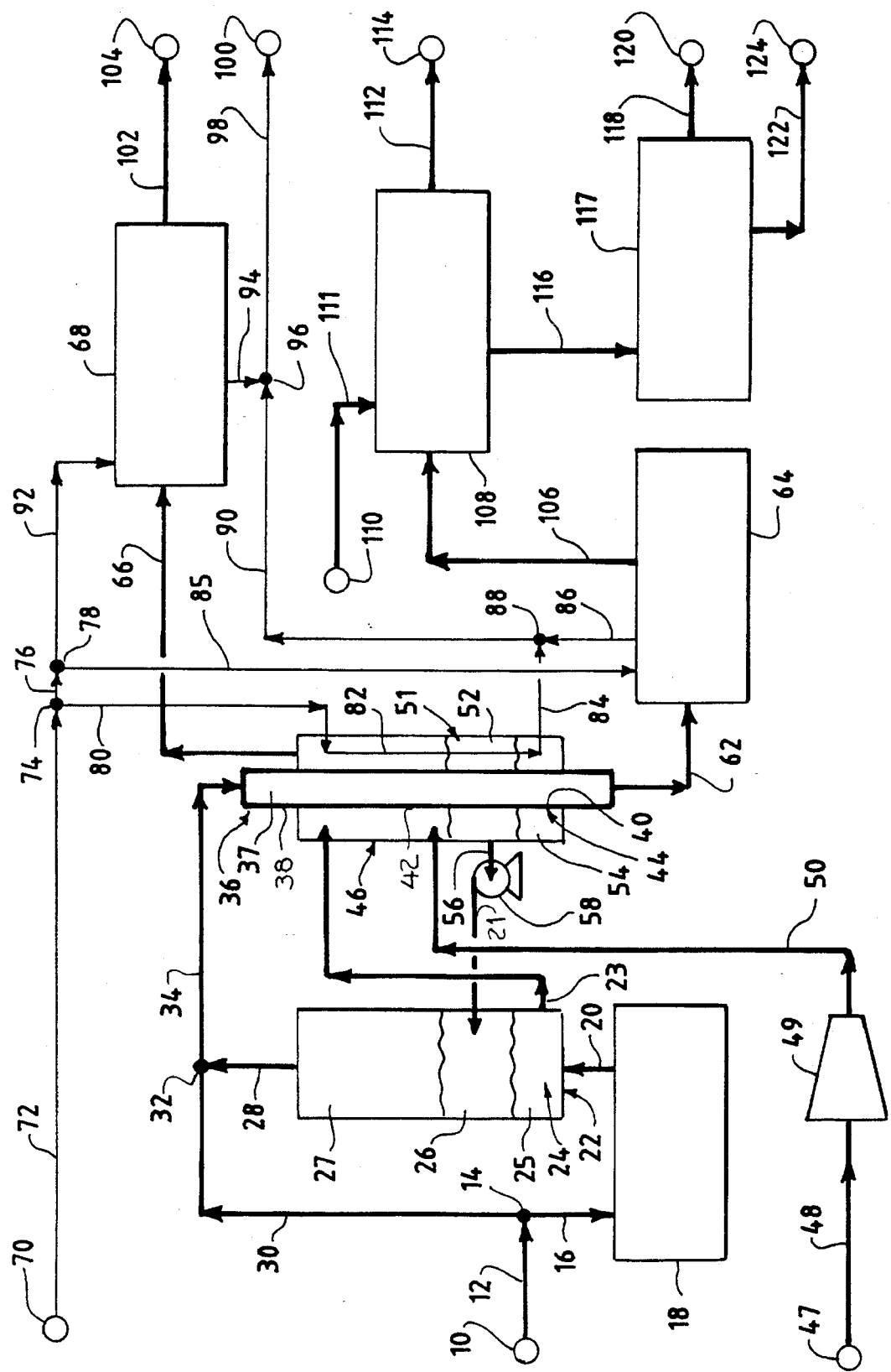

METHOD FOR PRODUCING SYNTHESIS GAS

BACKGROUND OF THE INVENTION

1. Field of the Invention

The invention relates generally to the utilization of lower alkanes and the synthesis of hydrocarbons. More specifically, the invention relates to conversion of a low molecular weight alkane such as methane to carbon oxides, hydrogen, and water.

2. Description of the Prior Art

The conversion of low molecular weight alkanes (lower alkanes) to synthetic fuels or chemicals has received increasing consideration as such low molecular weight alkanes are generally available from readily secured and reliable sources. Attention has focused on natural gas as a source of low molecular weight alkanes. Low molecular weight alkanes are present in many coal deposits and may be formed during mining operations, in petroleum production and refining processes, and in the gasification or liquefaction of coal, tar sands, oil shale, and biomass.

Accessibility is a major obstacle to effective and extensive use of remotely situated natural gas. Consequently, methods for converting low molecular weight alkanes to chemical feedstocks and to more easily transportable liquid fuels are desired. A number of such methods have been reported which can be conveniently categorized as direct oxidation routes or as indirect syngas routes. The direct oxidation routes convert lower alkanes to products such as methanol, gasoline, and relatively higher molecular weight alkanes. In contrast, the indirect syngas routes involve the production of synthesis gas (syngas) as an intermediate product.

The direct oxidation routes include oxidative coupling, electrophilic oxidation, oxychlorination, and direct partial oxidation. For example, an article by G. E. Keller and M. M. Bhasin published in the *Journal of Catalysis*, 73, 1982, 9–19, states that methane can be converted to $C_2$ hydrocarbons in the presence of reducible metal oxides. The Keller article outlines a reaction method involving the steps of: (1) charging the catalyst with oxygen by passing are oxygen-containing gas over the catalyst; (2) replacing the oxygen in the gas chamber of the catalytic reactor with an inert gas; (3) feeding methane over the catalyst, which partially produces the desired reaction; and (4) supplanting the residual methane and resulting product in the reactor with an inert gas before the sequence of steps is repeated.

The efforts of a number of other researchers in the area of oxidative coupling have been reported. For example:, Jones et al., U.S. Pat. Nos. 4,443,664-9 describe processes for synthesizing hydrocarbons containing as many as seven carbon atoms from methane. In the processes, methane is contacted with a reducible oxide of antimony, germanium, bismuth, lead, indium, or manganese. The aforesaid patents describe ranges of reaction temperature from a lower limit of 500° C. to an upper limit of 1000° C. After reduction, the reducible oxide is reportedly regenerated by oxidation with molecular oxygen. The oxidation may be conducted in a separate zone or by alternating the flow of methane-containing gas with the flow of an oxygen-containing gas.

Additionally, U.S. Pat. Nos. 4,665,260 and 4,560,821 issued to Jones et al. describe an oxidative coupling process in which moving beds of particles containing a reducible oxide of a metal are recirculated between a methane contact zone and an oxygen contact zone. However, efforts at oxidative coupling have bogged down in recent years because of disappointing yields.

Broadly stated, the indirect syngas routes operate by dehydrogenating and oxidizing methane to produce the mixture of hydrogen and carbon oxides known as syngas. Although the ratios of hydrogen and the carbon oxides in syngas may vary widely, all indirect syngas routes require a source of oxygen. For example, U.S. Pat. No. 5,112,527 issued to Kobylinski describes a process for converting natural gas to synthesis gas which utilizes ambient air as a source of oxygen. In the described process, a homogeneous mixture of lower alkanes and air is subjected to partial oxidation and steam reforming reactions in the presence of a first catalyst and water. The product stream from the first catalyst reportedly reacts with water in the presence of a second catalyst having steam reforming activity to produce carbon monoxide and hydrogen. The Kobylinski patent states that the use of air as an oxygen source may result in up to about 45 volume percent nitrogen as an inert component in the gaseous, syngas-containing product.

European Patent Application No. 0399833A1, describes a reactor equipped with separation membranes to exclude nitrogen gas when the reactor is charged with atmospheric air. The reactor reportedly comprises first and second zones separated by a solid multi-component membrane. The '833 application states that such reactors can be used to conduct the partial oxidation of methane to produce unsaturated compounds or synthesis gas.

Researchers have long been intrigued by the prospect of conducting oxidation and reduction reactions within a molten metal bed. An apparatus relating to a process for pyrometallurgically refining copper by passing a reducing hydrocarbon gas through an oxygen-containing molten copper bed is described in U.S. Pat. No. 3,650,519 issued to Vogt et al. The hydrocarbon gas can reportedly be methane, ethane, propane, butane, pentane, or natural gas. The '519 Patent states that injection of methane into a melt of copper containing 0.55 weight percent oxygen produced a gas mixture which, after reacting with the copper melt, was analyzed as having 24 percent $CO_2$, 13 percent CO, 14 percent $H_2$, and 3.3 percent $CH_4$. The '519 Patent does not record any recovery of the gas so produced.

U.S. Pat. No. 4,062,657 issued to Knuppel et al. is directed to a process and an apparatus for gasifying sulphur-bearing coal in a molten iron bath. Reportedly, hot liquid slag is transferred from the iron bath to a second vessel in which the slag is desulfurized by contact with an oxygen containing gas, and then returned to the iron bath for reuse. The '657 Patent notes that under favorable processing conditions a molten iron bath can gasify finely divided coal to produce a combustible gas having an approximate composition of about 70 to 80 percent carbon monoxide and about 15 to about 25 percent hydrogen.

An article by L. Meszaros and G. Schobel in *British Chemical Engineering*, January 1971, Volume 16, No. 1 describes a molten-bed reactor having a molten lead bath which facilitates the simultaneous oxidation and decarboxylation of furfurol to produce furan. Furfurol and air were reportedly bubbled through molten lead in stoichiometric ratio from a common furfurol-air inlet system and, alternatively, from a separate furfurol inlet and air inlet system. The article states that the method is useful for the partial oxidation of hydrocarbons, alcohols, aldehydes, and for the decomposition of natural gas and gasoline.

U.S. Pat. No. 4,406,666, issued to Paschen et al., is directed to a device for the gasification of carbon-containing material in a molten metal bath process to obtain the continuous production of a gas composed of carbon monoxide and hydrogen. The '666 Patent states that gaseous carbon materials as well as gases containing oxygen can be introduced into the reactor below the surface of the molten metal bath. The molten metal reportedly consists of molten iron, silicon, chromium, copper, or lead.

A method for converting carbon-containing feed, such as municipal garbage or a hydrocarbon gas, to carbon dioxide is described in U.S. Pat. No. 5,177,304 issued to Nagel. The carbon-containing feed and oxygen are introduced to a molten metal bath having immiscible first and second molten metal phases. The '304 Patent states that the feed is converted to atomic carbon in the bath, with the first metal phase oxidizing atomic carbon to carbon monoxide and the second metal phase oxidizing carbon monoxide to carbon dioxide. Heat released by exothermic reactions within the molten bath can reportedly be transferred out of the molten system to power generating means, such as a steam turbine.

U.S. Pat. No. 4,126,668 issued to Erickson presents a process for producing a hydrogen rich gas such as hydrogen, ammonia synthesis gas, or methanol synthesis gas. In the process, steam, carbon dioxide, or a combination of the two is reportedly reacted with a molten metal to produce a molten metal oxide and a gaseous mixture of hydrogen and steam. The '668 Patent states that the steam portion of the gaseous mixture can be condensed and separated to produce a relatively pure hydrogen stream. The molten metal oxide is said to be regenerated for further use by contact with a reducing gas stream containing a reformed hydrocarbon gas, such as reformed methane. When methanol is a desired product, appropriate amounts of carbon dioxide and steam are reportedly reacted with the molten metal, whereby $CO_2$ is reduced to CO and $H_2O$ is reduced to $H_2$ to produce a methanol synthesis gas. Alternatively, the '668 Patent states that the relatively high purity hydrogen stream can be subsequently reacted with $CO_2$ in a reverse water shift reaction to produce a methanol synthesis gas.

Although the efforts of prior researchers have produced many notable advances in the manufacture of synthesis gas, a need still exists for a new and better process for producing synthesis gas from lower alkanes. Desirably, the process utilizes air as a source of oxygen but also minimizes nitrogen dilution of the synthesis gas product while avoiding entirely the dangers of handling high-purity oxygen. In the interest of safety, the desired process keeps the lower alkanes separated from air at all times. Additionally, the process should be continuous in operation and capable of producing relatively high conversions of methane while maintaining good selectivities for carbon oxides and hydrogen. The process should include opportunities for integrating heat transfer between exothermic and endothermic portions of the process.

SUMMARY OF THE INVENTION

The invention is an improved method for producing synthesis gas from lower alkanes which utilizes two distinct molten baths as reactors. The first of the two baths is a molten metal oxide bath which delivers oxygen in a relatively safe and controlled manner to a feed stream containing lower alkanes. The metal oxide bath additionally enhances oxidation of the lower alkanes to produce carbon dioxide and a molten elemental metal. The metal is regenerated to metal oxide by contact with air in a second molten bath which is a molten metal bath. Heat evolved by exothermic reactions in the molten baths is transferred to an endothermic reforming reactor where a portion of the carbon dioxide is converted to a mixture of carbon oxides and hydrogen, widely known as synthesis gas.

In one aspect, the invention is a process for producing synthesis gas which comprises passing a feed stream and an influent oxidant stream through a combustion zone. The feed stream contains a lower alkane such as methane, ethane, propane, or butane. The influent oxidant stream contains a molten metal oxide. The lower alkane and the molten metal oxide react to produce an oxidized product stream containing carbon dioxide and water, as well as an effluent oxidant stream which includes relatively less of the metal oxide. The effluent oxidant stream and a regenerant stream including oxygen am passed through a regeneration zone where the two streams react exothermically to produce a regenerated oxidant stream and an exhaust stream. The oxidized product stream is passed to a reforming zone in which a catalyzed reforming reaction endothermically produces a synthesis gas stream which includes carbon monoxide and hydrogen. At least a portion of the heat liberated by exothermic reactions in the regeneration zone is transferred to the reforming zone to sustain the endothermic reforming reaction.

In another aspect, the invention is a continuous process for producing synthesis gas which comprises passing a feed stream which includes a lower alkane and an influent oxidant stream which includes a molten metal oxide through a combustion zone. The streams interact to produce an oxidized product stream which contains carbon dioxide and water. The interaction also produces an effluent oxidant stream which includes relatively less of the metal oxide. The effluent oxidant stream and an air stream are mingled to promote an exothermic reaction which yields heat, an exhaust stream, and a regenerated oxidant stream. Heat is transferred from the regenerated oxidant stream to the oxidized product stream through a heat exchanger. In a reforming zone which contains a reforming catalyst, the oxidized product stream is converted endothermically to produce a synthesis gas stream. The regenerated oxidant stream is returned to the combustion zone.

BRIEF DESCRIPTION OF THE DRAWING

FIG. 1 is a process flow diagram depicting an improved process which utilizes an improved oxygen concentration and delivery system for converting lower alkanes to synthesis gas.

DETAILED DESCRIPTION OF PREFERRED ASPECTS OF THE INVENTION

The invention is an improved process for producing synthesis gas from lower alkanes. Herein, synthesis gas is defined as a gaseous mixture of hydrogen ($H_2$) and carbon monoxide (CO) which can also contain relatively minor amounts of carbon dioxide ($CO_2$), water ($H_2O$) and diatomic nitrogen ($N_2$). Preferably, the product synthesis gas will have a desirably low molar ratio of hydrogen to carbon monoxide of less than about 3:1, preferably less than to about 2:1.

While the invention is applicable to conversion of alkanes generally, it finds special utility in the conversion of natural gas which is rich in methane. Typically, natural gas contains about 85 to about 95 volume percent methane, about 2 to about 10 volume percent ethane, and smaller amounts of propane and butane. Reference below to the use of methane as a gaseous feedstock is understood to be exemplary only. Similarly, although chemical equations relating to lead and lead oxide are provided below for clarity, it is understood that the present invention can be practiced with a variety of metals and metal oxides.

According to the invention, methane, for example, is introduced at or near the bottom of a molten metal oxide bath. Methane reacts exothermically with the molten metal oxide bath according to the reaction:

$$CH_4 + 4PbO \rightarrow CO_2 + 2H_2O + 4Pb \quad \Delta H = -11.8 \text{ kcal/mol } (1000°\text{ C.})$$

Gaseous carbon dioxide and steam exit the molten metal oxide bath and are mixed with additional methane prior to introduction into a reforming reactor. Alternatively, the molten metal oxide bath can be operated such that methane is only partially converted, and unreacted methane is carried into the reforming reactor. In either case, a mixture containing carbon dioxide, water, and methane is endothermically reformed in the presence of a catalyst to produce a mixture containing carbon monoxide and hydrogen by the following reaction:

$$3CH_4 + CO_2 + 2H_2O \rightarrow 4H_2 + 2CO \quad \Delta H = +171.4 \text{ kcal/mol } (1000°\text{ C.})$$

Additionally, a portion of the molten metal oxide bath which has been at least partially reduced by contact with methane is passed to a molten regenerating bath for oxidation by contact with a regenerant, such as air. Relatively inert gases, such as nitrogen, pass out of the regenerating bath unreacted. Oxygen from the air, for example, reacts to regenerate the metal oxide according to the formula:

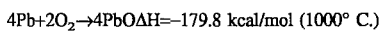

$$4Pb + 2O_2 \rightarrow 4PbO \quad \Delta H = -179.8 \text{ kcal/mol } (1000°\text{ C.})$$

In order to better communicate the invention, a preferred aspect of the invention is now described in some detail. This preferred aspect is not the only manner in which the invention can be applied, and it is understood that such a description does not limit the scope of the invention in any way.

Referring to FIG. 1, a feed stream containing natural gas is passed from a source 10 through a junction 14 and conduits 12 and 16 to an optional gas preheater 18 which heats the feed stream to a temperature appropriate for operation of a combustion zone 22. The preheater 18 is, for example, a fossil fuel-fired heater.

The feed stream passes through a conduit 20 and enters the combustion zone 22. Preferably, the combustion zone 22 operates in the range of about 600° to about 1200° C., more preferably about 800° to about 1000° C. The operating pressure of the combustion zone 22 is preferably in the range of about one atmosphere to about 2000 pounds per square inch (psig), more preferably from about 200 to about 600 psig. It is contemplated that the operating pressure of the combustion zone 22 is maintained at a slightly greater value than that of a downstream process which receives synthesis gas.

Located within the combustion zone 22, is a combusting bath 24 substantially composed of a molten metal oxide. Preferably, the metal oxide is the oxide of a metal selected from the group consisting of lead, antimony, bismuth, copper, zinc, tin, indium, and mixtures thereof. The oxides of lead, antimony, and bismuth are especially preferred, as are eutectic mixtures of the oxides of the aforementioned metals. Mixtures of antimony, bismuth, and lead and, alternatively, mixtures of copper, zinc, indium, and lead in appropriate proportions form particularly useful eutectic mixtures.

The combusting bath 24 includes a molten elemental metal portion 25. The combusting bath 24 is preferably stratified by buoyant forces arising from a difference in density so that the oxide portion 26 floats above the elemental portion 25. However, it is also contemplated that the process is operated at relatively great space velocities such that the feed stream agitates the combusting bath 24 to an extent that causes the oxide portion 26 to blend with the elemental portion 25.

In the combustion zone 22, the feed stream is chemically converted to produce an oxidized product stream including carbon dioxide and water. The oxidized product stream emerges from the combusting bath 24, preferably into a disengaging vapor space 27 of relatively low superficial velocity, and exits the combusting zone 22 via a conduit 28.

The conduit 28 extends to a junction 32. A second portion of the feed stream travels from junction 14, described above, through a conduit 30 to augment the oxidized product stream at the junction 32. The augmented oxidized product stream passes through a conduit 34 to a reforming zone 36. Steam is optionally injected into the reforming zone 36. The reforming zone 36 includes a reforming catalyst 37, preferably a catalyst containing nickel, copper, zinc, noble metals, or mixtures thereof. For the present purposes, the noble metals are gold, silver, platinum, palladium, ruthenium, iridium, rhodium, and osmium.

For the present purposes, reforming is defined as a catalyzed reaction between water and a hydrocarbon which produces carbon monoxide and hydrogen. For example, catalytic steam reforming of methane, refinery gas, or naphtha is a common source of hydrogen used in petroleum refineries. Hydrocarbons treated with steam in the range of about 1200° F. to about 1600° F. and at pressures in the range of about 400 psig to about 2000 psig in the presence of a suitable catalyst yield hydrogen and carbon oxides. Typically, a nickel-based catalyst is employed, often packed in tubes within a furnace. It is important to distinguish catalyzed reforming from the uncatalyzed steam pyrolysis of hydrocarbons.

In addition to the reforming reaction, other chemical reactions take place simultaneously within the reforming zone. Methane reacts with carbon dioxide to produce carbon monoxide and hydrogen. Hydrogen reacts reversibly with carbon dioxide to produce carbon monoxide and water. The ratio of carbon monoxide to hydrogen in the product synthesis gas stream can be varied to some extent by adjusting the relative amounts of oxygen, methane, and water entering the reforming zone. Because the reversible reaction of hydrogen with carbon dioxide has an equilibrium constant which is temperature-dependent, the temperature of the reforming zone can also affect the ratio.

Preferably, the reforming zone 36 is surrounded by a pressure vessel 38 having a heat transfer surface 40 exposed to the oxidized product stream. The heat transfer surface 40 and a relatively warmer heat transfer surface 42 constitute a heat exchanger 44. Heat energy to sustain the endothermic reforming reaction is preferably transported into the reforming zone 36 by the heat exchanger 44. As the oxidized product stream passes through the reforming zone 36, at least a portion is chemically convened to produce a synthesis gas stream which exits the reforming zone 36 by a conduit 62.

Returning now to the combustion zone 22, an effluent oxidant stream is withdrawn from the combusting bath 24 through a conduit 23. The effluent oxidant stream includes relatively less of the metal oxide as compared to an influent oxidant stream which enters the combusting bath 24 through a conduit 21. The effluent oxidant stream travels through the conduit 23 to an exothermic regeneration zone 46.

A regenerant stream, such as an air stream, passes from a source 47 through conduits 48 and 50 and a compressor 49 to the regeneration zone 46 where the regenerant stream mingles with the effluent oxidant stream. The mingling may be accomplished by mixing the streams together. However, it is preferred that the effluent oxidant stream be atomized prior to contact with the regenerant stream to provide more surface area for interaction between the streams and to reduce compression costs.

It is especially preferred that droplets of the effluent oxidant stream be permitted to fall through the regenerant stream while periodically coming into proximity with one or more transfer surfaces, such as the heat transfer surface 42. In this manner, heat liberated by an exothermic chemical reaction between the effluent oxidant stream and the regenerant stream is passed to the heat exchanger 44 and utilized to sustain the reforming reaction. Additionally, a portion of the heat liberated can be recovered by heat exchangers, such as a heat exchanger 82 which heats boiler feed water routed from a source 70 through a junction 74 via conduits 72 and 80. The heated boiler feed water leaves the exchanger 82 via a conduit 84 and a junction 88.

The regeneration of the effluent oxidant stream produces a regenerated oxidant stream having a proportion of the above-described metal oxide which is approximately equal to the proportion of the metal oxide in the influent oxidant stream. Preferably, the regenerated oxidant stream is collected as a regenerating bath 51. Although it is preferred that the regenerating bath 51 be composed predominantly of molten metal oxide, the present invention may be practiced with some amount of elemental metal oxide present. For example, the metal oxide and the metal may be blended throughout the regenerating bath 51. Alternatively, the metal oxide may be present as a separate molten phase 52 floating on a distinguishable molten metal phase 54.

The present invention can be practiced by injecting the regenerant stream directly into the regenerating bath 51. However, if the regenerant stream is merely injected under the surface of a molten metal bath and permitted to rise as bubbles under the influence of gravity, an injection pressure in excess of 400 psig may be required to overcome the relatively high densities exhibited by molten metals.

Accordingly, it is preferred to reduce compression costs by introducing the regenerant stream from the conduit 50 into the regeneration zone 46 at a pressure no higher than is absolutely necessary. To this end, the regeneration zone 46 is preferably operated at approximately atmospheric pressure with the effluent oxidant stream falling counter-currently as droplets, sheets, or rivulets through a rising stream of gaseous regenerant.

Preferably, baffles and redistributors (not shown in FIG. 1) are located in the path of the counter-current streams so as to improve contact. For example, the reforming zone 36 and the regeneration zone 46 may be constructed as a horizontal shell and tube exchanger, wherein the reforming catalyst is packed in horizontal tubes and the effluent oxidant stream drips downward across external surfaces of the tube, including the heat transfer surface 42, while the regenerant stream rises through the shell side of the exchanger and interacts with the effluent oxidant stream. The regenerated oxidant stream exits the regeneration zone 46 by means of a conduit 56, preferably under the influence of a pump 58, and returns to the combusting bath 24 through the conduit 21.

The exothermic reaction between the regenerant stream and the effluent oxidant stream in the regeneration zone 46 produces an exhaust stream which, averaged over time, is relatively depleted in oxygen as compared to the regenerant stream drawn from the source 47. Operation which depletes the oxygen from the regenerant stream entirely is within the scope of the present invention. However, it is also contemplated to operate the present invention so that the exhaust stream contains a substantial amount of diatomic oxygen.

After leaving the regeneration zone 46 by a conduit 66, the exhaust stream is preferably cooled by exchange with boiler feed water in a heat exchanger 68. The boiler feed water is withdrawn, for example, from the conduit 72 through junctions 74 and 76 and is delivered to the heat exchanger 68 by conduits 76 and 92. Steam produced in the heat exchanger 68 exits by a conduit 94. Cooled exhaust gas is conducted from the heat exchanger 68 by a conduit 102 leading to a destination 104, such as a vent to atmosphere.

Directing attention again to the synthesis gas stream leaving the reforming zone 36 through the conduit 62, a significant amount of heat energy can be recovered by passing the stream through one or more heat exchangers such as the heat exchanger 64. For example, boiler feed water from the conduit 72 is passed through junctions 74 and 76 and through conduits 76 and 85 to the heat exchanger 64 where the boiler feed water stream is vaporized to produce steam. The steam is conducted by conduits 86, 90, and 98 to a destination 100. A cooled synthesis gas stream leaves the heat exchanger 64 by means of a conduit 106.

The cooled synthesis gas stream may be treated to remove components other than carbon monoxide and hydrogen. When carbon dioxide removal is desired, the cooled synthesis gas stream is washed with a basic aqueous solution in a wash tower 108. The basic aqueous solution typically comprises sodium carbonate and minor amounts of diethanol amine, although many alkanol amines for carbon dioxide removal are known. The basic solution is carried to the wash tower 108 from a source 110 by a conduit 111. Spent solution leaves the wash tower 108 by means of a conduit 116 and is preferably conducted to a stripping tower 117 which produces a carbon dioxide-rich stream that is directed through a conduit 118 to a destination 120. The stripping tower 117 also produces a spent water stream which travels through a conduit 122 to a destination 124 for disposal or recovery.

The cooled synthesis gas stream enters the wash tower 108 through the conduit 106, which was described above. A purified synthesis gas stream exits the wash tower 117 through a conduit 112 to be stored or utilized at a destination 114. It is contemplated that the synthesis gas produced is utilized as a feed stock for methanol synthesis. Alternatively, the synthesis gas can be utilized as a feed stock for dimethyl ether synthesis or for the synthesis of olefins. Additionally, the synthesis gas may be utilized as a feed stock for a Fischer-Tropsch reaction in order to produce, for example, hydrocarbons having about five to about 11 carbon atoms.

The following examples are presented in order to better communicate the invention and are not intended to limit the scope of the claims in any way.

EXAMPLE 1

Methane was passed through a bed of molten lead oxide held at 1000° C. Off gas was monitored by gas chromatograph. The results are presented in Table 1 below.

| Flow sccm | Space velocity min-1 | $CH_4$ conv, % | Selectivities, % | | | % $H_2$ in gas |
|---|---|---|---|---|---|---|
| | | | $CO_2$ | CO | $C_2^+$ | |
| 3.41 | 1.71 | 78.2 | 93.8 | 3.8 | 2.4 | 3.3 |
| 7.33 | 3.68 | 49.7 | 83.3 | 4.2 | 12.5 | 5.7 |
| 15.15 | 7.63 | 24.5 | 65.4 | 14.6 | 20.0 | 9.2 |

Inspection of Table 1 reveals that a relatively high methane conversion was obtained at a space velocity of 1.71 per minute. By extrapolation, it is likely that complete conversion of methane could be obtained at still lower space velocity. Conversely, methane conversion was lower and the production of carbon monoxide and $C_2+$ hydrocarbons was greater at relatively higher space velocities. As a hypothesis, it is possible that the carbon monoxide and $C_2+$ hydrocarbons were produced by pyrolysis of methane in a vapor space which existed above the molten bed. If this hypothesis proves true, minimizing the vapor space above the molten bed should reduce the amount of carbon monoxide and $C_2+$ hydrocarbons produced.

EXAMPLE 2

An air stream was injected into a bed of molten lead metal at 1000° C., and a resulting exhaust gas was analyzed by gas chromatography. Nearly complete consumption of oxygen was observed at all air flow rates up to the limits of the experimental apparatus. Specifically, an air stream was passed through the bed at a space velocity of 46.9 per minute. Only a negligible amount of oxygen was detected in the exhaust stream until a relatively abrupt breakthrough occurred indicating that substantially all of the molten lead had been oxidized.

Examples have been presented and hypotheses advanced in order to better communicate certain facets of the invention. The scope of the invention is determined solely by the intended claims and is not limited in any way by the examples or the hypotheses. Moreover, practitioners who study the teachings set forth above will undoubtedly receive suggestions which bring to mind additional aspects of the invention. Such obviously similar aspects, whether or not expressly described herein, are intended to be within the scope of the present claims.

What is claimed:

1. A process for producing synthesis gas, which comprises:
    passing a feed stream composed substantially of a lower alkane having from one to four carbon atoms and an influent oxidant stream which includes a molten metal oxide through a combustion zone to produce an oxidized product stream which includes carbon dioxide and water and an effluent oxidant stream which includes relatively less of the metal oxide as compared to the influent oxidant stream;
    passing the effluent oxidant stream and a regenerant stream including oxygen and nitrogen through an exothermic regeneration zone to produce a regenerated oxidant stream and an exhaust stream; and
    passing the oxidized product stream to an endothermic reforming zone containing a reforming catalyst to produce a synthesis gas stream which includes carbon monoxide and hydrogen;
    wherein at least a portion of the heat liberated in the regeneration zone is transferred to the reforming zone.

2. The process of claim 1 wherein the lower alkane in the feed stream is partially reacted in the combustion zone and an unreacted portion of the lower alkane is passed to the reforming zone.

3. The process of claim 1 wherein an additional quantity of the lower alkane is mixed with the oxidized product stream and the resulting mixture is passed to the reforming zone.

4. The process of claim 1 wherein the reforming zone is adjacent to a heat exchanger having two heat transfer surfaces, the regenerated oxidant stream is passed into proximity with one of the heat transfer surfaces, and the effluent oxidant stream is passed into proximity With another of the heat transfer surfaces.

5. The process of claim 1 wherein the molten metal oxide is the oxide of a metal selected from the group consisting of lead, antimony, bismuth, copper, zinc, tin, indium, and mixtures thereof.

6. The process of claim 1 wherein the regenerant stream is air.

7. The process of claim 1 wherein the exhaust stream contains a substantial amount of diatomic oxygen.

8. The process of claim 1 wherein the reforming catalyst contains a metal selected from the group consisting of nickel, copper, zinc, noble metals and mixtures thereof.

9. The process of claim 1 wherein steam is injected into the reforming zone.

10. The process of claim 1 wherein the combustion zone is at a temperature in the range of about 600° C. to about 1200° C.

11. The process of claim 1 wherein the synthesis gas stream is nitrogen-free.

12. The process of claim 1 wherein the lower alkane is methane.

13. A continuous process for producing synthesis gas which comprises:
    passing a feed stream composed substantially of a lower alkane and an influent oxidant stream which includes a molten metal oxide through a combustion zone to produce a substantially oxidized product stream which contains carbon dioxide and water and an effluent oxidant stream which includes relatively less of the metal oxide as compared to the influent oxidant stream;
    mingling the effluent oxidant stream and an air stream which reacts exothermically with the effluent oxidant stream to produce heat, an exhaust stream, and an at least partially regenerated oxidant stream;
    transferring heat from the regenerated oxidant stream to the oxidized product stream through a heat exchanger having a relatively warmer heat transfer surface exposed to the regenerated oxidant stream and a cooler heat transfer surface exposed to the oxidized product stream;
    passing the oxidized product stream to a reforming zone which contains a reforming catalyst to produce a synthesis gas stream by an endothermic chemical reaction; and
    passing the regenerated oxidant stream to the combustion zone.

14. The process of claim 13 wherein an additional quantity of the lower alkane is mixed with the oxidized product stream.

15. The process of claim 13 wherein the molten metal oxide is the oxide of a metal selected from the group consisting of lead, antimony, bismuth, copper, zinc, tin, and mixtures thereof.

16. The process of claim 13 wherein steam is injected into the reforming zone.

17. The process of claim 13 wherein the synthesis gas is nitrogen-free.

18. The process of claim 13 wherein the effluent oxidant stream is atomized and sprayed into the air stream.

19. The process of claim 13 wherein the feed stream is preheated before being passed to the combustion zone.

20. The process of claim 13 wherein the lower alkane is methane.

* * * * *

UNITED STATES PATENT AND TRADEMARK OFFICE
CERTIFICATE OF CORRECTION

PATENT NO. : 5,478,370
DATED : December 26, 1995
INVENTOR(S) : Michael J. Spangler It is certified that error appears in the above-indentified patent and that said Letters Patent is hereby corrected as shown below:

| Col. | Line | |
|---|---|---|
| 1 | 42-43 | "charging the catalyst with oxygen by passing are oxygen-containing gas over the catalyst;" should read --charging the catalyst with oxygen by passing an oxygen-containing gas over the catalyst;-- |
| 4 | 10-11 | "The effluent oxidant stream and a regenerant stream including oxygen am passed through a regeneration zone" should read --The effluent oxidant stream and a regenerant stream including oxygen are passed through a regeneration zone-- |

Signed and Sealed this

Twenty-sixth Day of March, 1996

Attest:

BRUCE LEHMAN

Attesting Officer   Commissioner of Patents and Trademarks